Sept. 4, 1962 V. J. LACY 3,051,972
SNOW REMOVAL DEVICE
Filed Jan. 11, 1960
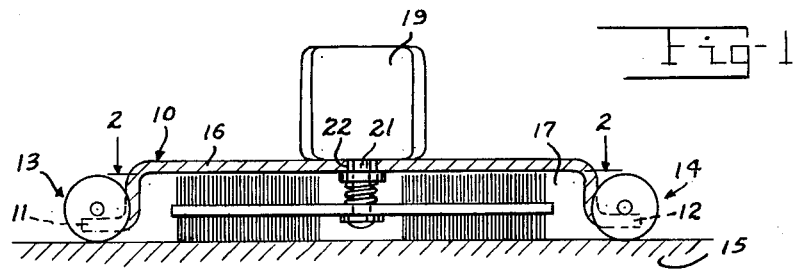
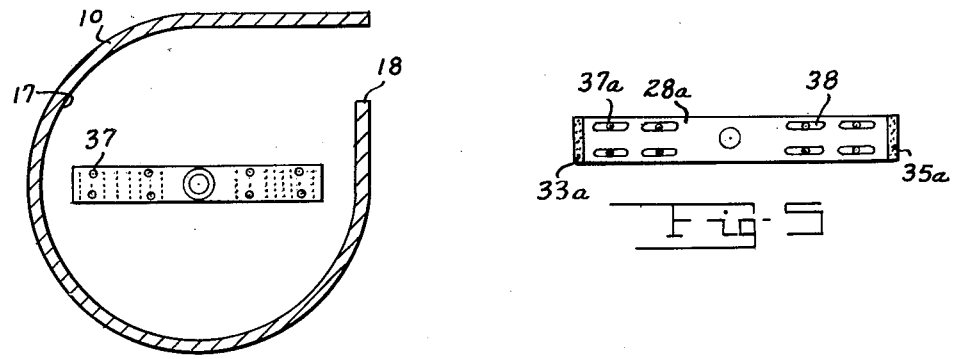
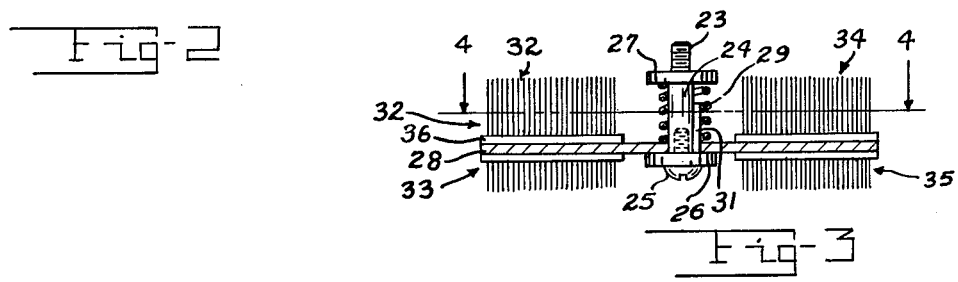
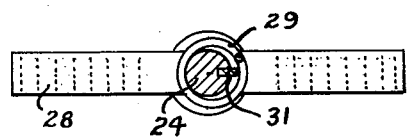
INVENTOR.
VERNON J. LACY
BY Tom Walker
ATTORNEY

United States Patent Office 3,051,972
Patented Sept. 4, 1962

3,051,972
SNOW REMOVAL DEVICE
Vernon J. Lacy, 27 Virginia Ave., Dayton, Ohio
Filed Jan. 11, 1960, Ser. No. 1,462
6 Claims. (Cl. 15—79)

This invention relates to snow removal devices utilizing a principle of rotary brushing of ground surface, the invention having especial although not limited utility as an attachment for the converting of rotary power lawn mowers for snow removal.

The object of the invention is to simplify the construction as well as the means and mode of operation of snow removal devices, whereby such devices may not only be economically manufactured, but will be more efficient and satisfactory in use, adaptable to a wide variety of applications, and be unlikely to get out of order.

An object of the invention is to provide attachment or accessory means, adapted to a removal of snow and ice from ground surface, which can be substituted as a unit in a power lawn mower for the moving blade.

Another object of the invention is to provide for a self-cleaning action of the mower housing whereby to obviate misoperation resulting from an accumulating of snow and ice therein.

A further object of the invention is to provide a powerful yet yielding scraping action in a device as described effective not only to remove loose snow but coverings of hard packed snow and ice.

A still further object of the invention is to present a generally new form of attachment for power lawn mowers and the like featuring a brush for snow removal.

A further object of the invention is to provide a snow removal device possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the accompanying drawings, or their equivalents.

Referring to the accompanying drawing wherein is shown one but obviously not necessarily the only form of embodiment of the invention, FIG. 1 is a view in longitudinal section, and partly diagrammatic, of a rotary lawn mower, the handle being omitted, adapted for snow and ice removal in accordance with an illustrated embodiment of the invention.

FIG. 2 is a view in horizontal section taken substantially along the line 2—2 of FIG. 1.

FIG. 3 is a detail view of a brush unit in accordance with the embodiment of FIGS. 1 and 2.

FIG. 4 is a view in horizontal section taken substantially along the line 4—4 of FIG. 3.

FIG. 5 is a detail plan view of a brush device showing an alternate manner of mounting the brush elements.

Like parts are indicated by similar characters of reference throughout the several views.

Referring to the drawing, a rotary power mower of the kind in which the invention is illustratively embodied comprises a housing 10 provided at its opposite ends with offset and projecting lips 11 and 12 welded or otherwise secured to respective wheel assemblies 13 and 14. A handle (not shown) conventionally is attached to the housing 10 in order that the mower may be rolled and guided over the surface of the ground indicated at 15.

The underside of the housing 10 is recessed to provide in effect a mounting plate 16 which is in elevated spaced relation to ground surface 15 and approximately parallel thereto. The arrangement is one to form an interior chamber 17 which is closed at its upper end by mounting wall 16 and which opens at its bottom onto ground surface 15. The housing 10 has in plan view generally the configuration as shown in FIG. 2 and as there seen a lateral opening 18 provides for discharge from the interior chamber 17.

The mounting plate 16 supports power means for the mower which conventionally comprises a gasoline engine or an electric motor. Here a housing 19 for such motive means is installed on the plate 16 in superposed overlying relation thereto and to the interior chamber 17. A driven shaft 21 projects from the underside of the housing 19 through an opening 22 in the plate 16 and projects into the interior chamber 17. The projecting end of the shaft 21 is formed with an internally threaded bore receiving a correspondingly threaded stud 23 on the upper end of a stub shaft 24 vertically disposed in the chamber 17 to serve as an extension 24. A bolt 25 or the like is installed to define a shoulder against which a washer 26 may limit. Intermediate the threaded stud 23 and the body proper of shaft extension 24 another shoulder is defined providing a seat for another washer 27. The shaft extension 24 is passed through a blade 28 at an intermediate point between the ends thereof. The blade 28 tends to rest by gravity on the washer 26 and there is interposed between the blade and the upper washer 27 a compression spring 29. A key 31 connects the blade 28 to the shaft 24 for unison rotary and relative longitudinal or vertical motion.

The blade is in the form of a flat and inflexible metal blade. Outwardly of the shaft 24, and on opposite sides thereof, the blade mounts brush means. This means comprises, in the illustrated instance, a plurality of individual brushes 32—35 constructed in identical fashion, each comprising a backing plate 36 in which is mounted relatively stiff and wear resistant bristles for heavy duty work. According to a feature of the invention the brush means comprises not only brushes 33 and 35 mounted on the underside of the blade 28 to contact ground surface but also brushes 32 and 34 mounted on the upper surface of the blade to project upwardly in interior chamber 17. According to the construction and arrangement of parts the blade 28 is supported on the extension shaft 24 in a position to place the bristles of lower brushes 33 and 35 approximately in the plane of the lower periphery of the wheel assemblies 13 and 14 and thereby approximately at ground surface. The upper brushes 32 and 34 extend toward the mounting plate 16, occupying the major part of the space between such mounting plate and the blade 28. As as result, rotation of the shaft extension 24 moves the lower brushes 33 and in contact with ground surface or with snow and ice coatings thereon. At the same time the upper brushes 32 and 34 traverse the interior of the housing in a manner to obviate the formation of or to remove any accumulation of snow and ice which might tend to restrict effective operation of the device. The material swept up by the device is discharged therefrom in the main through the housing opening 18.

The several brush elements are secured to the blade 28 in a detachable manner in any convenient manner. In the illustrated instance bolts 37 are passed through the blade 28 and through the backs 36 of an upper and a lower set of brushes to hold both securely to the blade. Should longitudinal adjustment of the brushes be found desirable, as for purposes of balance regulation, this also may be provided for in a convenient manner. Thus, and as seen in FIG. 5, a blade 28$^a$ may be formed with elongated slots 38 for passage of connecting bolts 37$^a$. Upon loosening of the bolts 37$^a$, therefore, the brushes may be adjusted longitudinally of the blade 28$^a$ within the limits of the slots 38.

Further according to a feature of the invention the assembly as illustrated in FIG. 3 comprising the blade and brushes thereon as well as the shaft extension 24 and associated washers and spring 29 has a unitary character and may be so installed in a rotary power lawn mower as a substitute for a removed grass cutting blade. Thus, existing lawn mowers may be readily adapted for use as snow removal devices, although it is of course within the inventive concept that the snow removal assembly be integrated into equipment having snow removal as its principal function. The spring 29 interposes a yield in the operation of the device whereby irregularities in ground surface or a resistant ice formation will not stall or unduly retard the rotary action of the device. This interposed yield can be eliminated, however, in which case any enforced yielding would occur in the bristles 36 and in the slip clutch which forms a conventional part of mower equipment. In the use of the illustrated assembly, obstructions in the path of the lower brushes result in an upward thrust upon the blade, which thrust is absorbed in the spring 29 as upper washer 27 limits against the shaft 21 or against the underside of the mounting plate 16.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. A snow removal attachment for rotary power mowers having a wheel mounted housing, motive means mounted on the upper surface of said housing and a vertically disposed driven shaft; comprising a shaft extension detachably connected to said shaft and having a lower end below the under surface of said housing; a horizontally disposed blade mounted on said shaft extension in spaced relation to the undersurface of said housing, said shaft extension and said blade forming an attachment assembly substituted as unit to be adapted to a rotary mower for snow removal; and brush means on said blade arranged in longitudinally extending rows in the plane of said blade and projecting vertically from upper and lower surfaces thereof, said brush means being disposed on said blade to traverse ground surface and to clear the interior of the housing of accumulated snow and ice.

2. A snow removal device, including a housing formed with an interior chamber open through the bottom of said housing and having a lateral discharge outlet, wheels holding said housing elevated relative to ground surface, motive means mounted on said housing, a vertically disposed shaft in said interior chamber connected through the housing to said motive means for rotation thereby, a horizontally disposed blade mounted on said shaft to be rotated thereby in said interior chamber, brush means dependent from said blade to extend approximately into contact with ground surface, and brush means on said blade extending upwardly in said interior chamber to clear said chamber of accumulated snow and ice, both said brush means projecting vertically from said blade in the plane thereof.

3. A snow removal device according to claim 2, characterized by means interposing a yield in the mounting of said blade to said shaft enabling said blade to adjust to irregularities in ground surface.

4. A snow removal device according to claim 2, characterized by means for detachably mounting said brush means on said blade, said mounting means comprising pin and slot connections providing for adjustment of said brush means relative to said blade means.

5. A snow removal device, including a housing, wheels supporting said housing for rolling on ground surface, said housing being formed with a recessed mounting plate defining an interior chamber opening to ground surface and being further formed with a lateral discharge outlet from said chamber, motive means installed on said mounting plate in overlying relation thereto and to said interior chamber, a vertically disposed shaft in said interior chamber perpendicular to said mounting plate and connected through said plate to said motive means for rotation thereby, and a brush device horizontally disposed in said interior chamber in driven relation to said shaft constructed and arranged for wiping contact with ground surface, said device including a blade attached intermediate its ends to said shaft and further including upwardly and downwardly facing brushes mounted on said blade in the plane thereof, the upwardly facing brushes maintaining said interior chamber free of snow and ice, said brush device being operatively connected to said shaft for unison rotary motion and relative vertical motion, said connection including yielding means urging the brush device normally toward contact with ground surface.

6. A snow removal device, including a housing formed with an interior chamber open through the bottom of said housing and having a lateral discharge outlet, wheels holding said housing elevated relative to ground surface, motive means mounted on said housing, a vertical disposed shaft in said interior chamber connected through the housing to said motive means for rotation thereby, a horizontally disposed blade mounted on said shaft to be rotated thereby in said interior chamber, flexible sweep means anchored to said blade and extending vertically downward therefrom for brushing contact with ground surface, and other means anchored to said blade and extending vertically upward therefrom to clear said chamber of snow and ice, expelling accumulations thereof from said interior chamber out said lateral discharge outlet, said flexible sweep means and said other means projecting vertically from said blade in the plane thereof and in diametrically opposed relation to one another.

References Cited in the file of this patent

UNITED STATES PATENTS

| | | |
|---|---|---|
| 2,471,367 | Cavaness | May 24, 1949 |
| 2,592,755 | Soenksen | Apr. 15, 1952 |
| 2,707,362 | Thelander | May 3, 1955 |
| 2,863,162 | Draughon | Dec. 9, 1958 |
| 2,984,919 | Stoddard | May 23, 1961 |